United States Patent
Sauer et al.

[15] 3,692,283
[45] Sept. 19, 1972

[54] DEVICE FOR PREPARATION OF SUSPENSIONS

[72] Inventors: Theo Sauer, Starnberg; Rolf-Fred Posse, Leverkusen; Gunter Schulz, Holzkirchen, all of Germany

[73] Assignee: Agfa-Gevaert Aktiengesellschaft, Leverkusen, Germany

[22] Filed: Dec. 21, 1970

[21] Appl. No.: 100,275

[30] Foreign Application Priority Data

Dec. 20, 1969 Germany..........P 19 63 919.1

[52] U.S. Cl.................................................259/24
[51] Int. Cl.............................................B01f 7/16
[58] Field of Search............259/7, 8, 5, 6, 21, 22, 23, 259/24, 40, 41, 42, 43, 44, 95, 96, 97

[56] References Cited

UNITED STATES PATENTS

| 2,474,592 | 6/1949 | Palmer | 259/23 |
| 1,560,826 | 1/1925 | Kirschbraun | 259/7 |
| 1,982,002 | 11/1934 | Hatch | 259/7 |

Primary Examiner—Robert W. Jenkins
Attorney—Connolly & Hutz

[57] ABSTRACT

Suspensions, such as silver halide containing suspensions, are prepared by disposing a basic component in a kettle or tank and adding further components thereto by means of a separating tube in the tank. The upper section of the tube has a conveyor with a motor driven paddle or the like, while the lower section has mixing nozzle valves each of which has a variably opening circular slot which opens by means of flow pressure overcoming pretensioning in the valves.

10 Claims, 2 Drawing Figures

DEVICE FOR PREPARATION OF SUSPENSIONS

BACKGROUND OF INVENTION

This invention relates to a device and process for the preparation of suspension or the like, particularly silver-halide-containing photographic suspensions, wherein to a basic component (such as gelatine) located in a vessel, there are added by means of dosing pumps or the like further components (such as a silver nitrate solution) with the components being dispersed in the mixture.

According to the customary process for the preparation of such suspensions, to a basic component located in a tank, are delivered further components in free fall or by means of dosing pumps or the like, generally from inlet pipes terminating above the tank or the liquid level, and all components are dispersed in each other by stirring by means of one or several, sometimes eight, stirrers dipped in eccentrically and inclined into the liquid level. The purpose of the stirring is to achieve an enduring displacement of the individual particles of the components with respect to each other by irregular rotational movements with strongly curved paths and in this connection simultaneously also to force the total liquid in the vessel to a permanent equalization in itself.

This process has a number of disadvantages which are particularly unsuitable when preparing suspensions of components reacting together. Specifically the process is unsuitable with suspensions wherein a reaction as equal in distribution and time in all its zones is desirable or required for the total mixture.

In adding the components through constantly open outlet openings of the intake pipes, despite the use of a very precisely operating dosing pump, it is unavoidable, after changing its conveying capacity or after its stoppage, that parts of the particular components leak or drip into the mixture. As a result the quantity of the components delivered or to be delivered can practically not be determined with the required precision. Additionally, reactions are initiated even after the point of time actually provided therefor. Due to these timely and quantitative differences with a preparation, and only quite successive mixtures, are there required any considerable fluctuations in the nature of the suspension.

In the dispersion of the components in each other, there results due to stirring further effects which are usually not precisely controllable. These further effects prevent a particularly quick dispersion and a comparability of the preparation or even preparations. The basic problems of stirring are so well known to those skilled in the art that no explanation of the particulars is required hereon. In the prior processes, it has been particularly shown that by stirring an equal distribution of all components in all areas of the preparation is achieved only with difficulty, and consequently a required equalization of a preparation in a relatively short time span is therefore difficult to obtain.

SUMMARY OF INVENTION

An object of this invention is to provide a process for the preparation of suspensions or the like, wherein the above-mentioned disadvantages of the known processes are avoided.

A further object is to provide such a process in which it is possible to deliver to the basic component the further components determined precisely as to time and quantity and to achieve within the shortest possible time an even dispersion of the components in all volume elements of a preparation which, in successive variably sized preparations, leads to results always equal to each other as well as reproducible without difficulty.

A still further object of this invention is to provide a device for the carrying out of the process which device is economical to construct and operate without affecting its reliability.

In the initially described process, this problem is first of all solved according to the invention in that the basic component, situated in the tank, is mixed in a flow which is essentially directed downward in its outer circular-shaped zone, and from there, separated in stages, rising at fast acceleration in its interior zone, and consequently revolving in a rotationally symmetric manner. To the basic component is delivered in cross-current the first of the further components, and in the subsequent rising flow zone, the second of the further components. In this manner fields or clusters with a concentration of one of the components cannot form. The preparation, independent of its size or the level in the tank, is therefore uniformly treated in all its parts. Additionally, as a result of the cross-current, a uniform dispersion of the delivered components into the basic component or the resulting preparation takes place very quickly. Due to the fine and uniform dispersion of the components already during the delivering and due to the very small time differences of the occurrence of this dispersion, there consequently results within the preparation a reaction cycle substantially the same for all its volume elements.

A novel embodiment of the process consists of the cross-current which is obtained by delivering the further components under pressure by means of a dosing pump or the like to overcome the pressure of a spring pretension in its discharge mixing nozzle valve. The components are brought up through the circular valve slot which is opened variably in its rotationally symmetrical cross-section. Accordingly not only a particularly stable and effective cross-current is achieved in a very simple manner, but also a very precise, in both time and quantity, delivery of the further components are also given, so that within a preparation for all its volume elements and with respect to several succeeding preparations, a uniform reaction cycle is assured. This reproducibility in the preparation of photographic suspension, in particular, is of decisive importance.

In addition, according to the invention, a device for the execution of the process is provided. This device includes a rotationally symmetric tank. Concentric to the tank and to each other, for separating the outer circular ring zone from the zone situated in the interior or in the downwardly directed flow zone from the rising flow zone, there is provided a separating tube. Approximately at or in its upper section of this tube is a conveyor with uninterrupted conveyance, such as by a motor driven paddle wheel, propeller, or the like, for bringing about of the rotationally symmetrical revolving current. In the area of the lower end section of the separating tube and in the area above it, again concentrically to the tank or to the separating pipe, are mixing nozzle valves. Each valve is arranged with a circular slot, situated in a plane perpendicular to the vertical axis of the device, nearly radially directed thereto, opening—variably in its rotationally symmetric cross-section—against the pressure of a spring pretension by the pressure resulting from the particular component by means of a dosing pump or the like.

It is furthermore provided by the invention that in the device the cross-sectional opening of the separating pipe has smaller measurements than the annular cross-sectional opening between the separating pipe and the wall of the tank. In this similar manner there is achieved high velocity or, as compared to the velocity of the sinking flow zone, a higher velocity of the rising flow zone of the basic component or of the resulting preparation and a corresponding quick dispersion of the components delivered in cross-current in this flow zone.

A further advantageous development consists of having the lower section of the separating pipe and both mixing nozzle valves arranged in a cup or the like, concentrically connected at the bottom of the tank, representing in this connection a section of the tank. This arrangement makes it possible to an exceptional degree, to produce preparations of rather variable size in one and the same tank while maintaining all advantages of the process.

According to another novel development, the conveyor is arranged in an upper section of the separating pipe, closed per se, expanded in a capsular shape, as the case may be, but provided with an approximately nozzle-like opening inclined to the vertical axis up to radially directed. In this arrangement the positive movement of the rotationally symmetric revolving current experiences a support and the openings experience an additional, even if a subordinate, effect in the dispersion of the components in each other.

Finally, the mixing nozzle valves of the invention essentially consist of a valve body or a valve casing, having an outside surface which is suitably expanded conically to the circular slot, with a passage canal leading to the circular slot. A frontal flange surface represents one wall of the circular slot while the other wall is a valve disk, springy per se, affected by deformed mounting of the spring pretension and pressed on to the frontal flange surface of the valve body or of the valve casing by the pressure produced by this spring pretension.

THE DRAWINGS

FIG. 1 schematically illustrates a device for carrying out the process for the preparation of suspensions within an installation particularly designed for the preparation of suspensions containing silver halide, with the device per se being taken in a plane through its vertical axis; and FIG. 2 schematically illustrates in cross-section a portion of the device of FIG. 1 on an enlarged scale.

DETAILED DESCRIPTION

Figure 1:
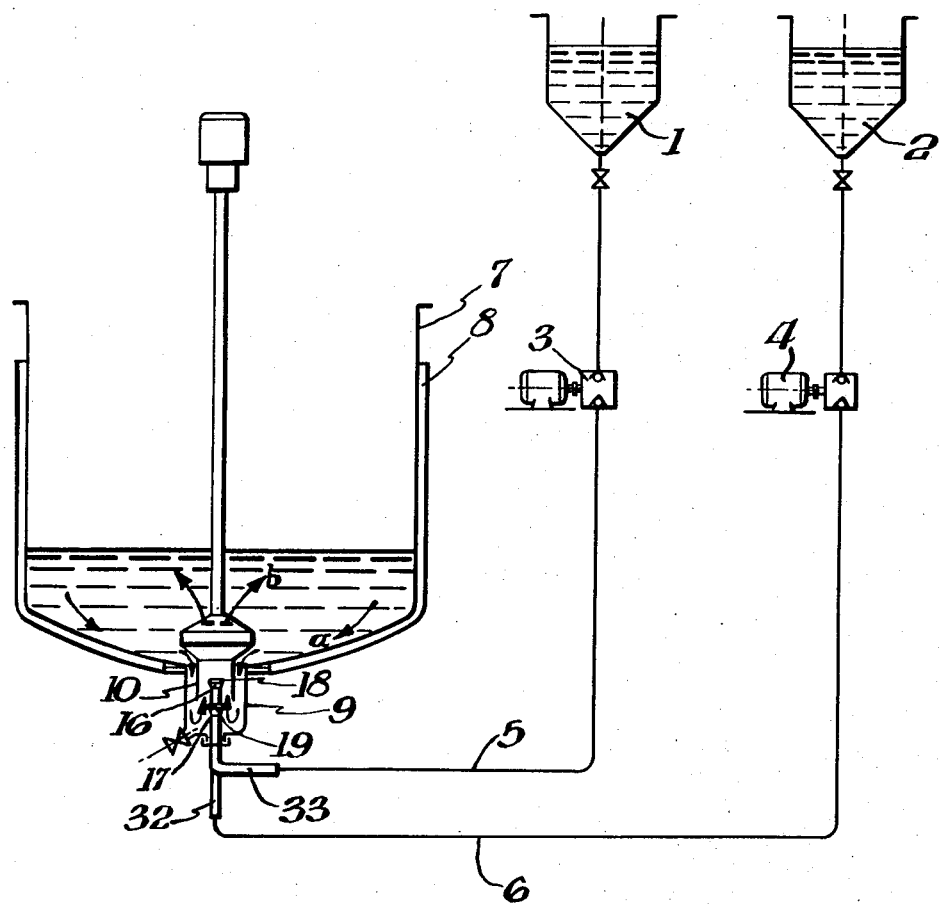
Figure 2:
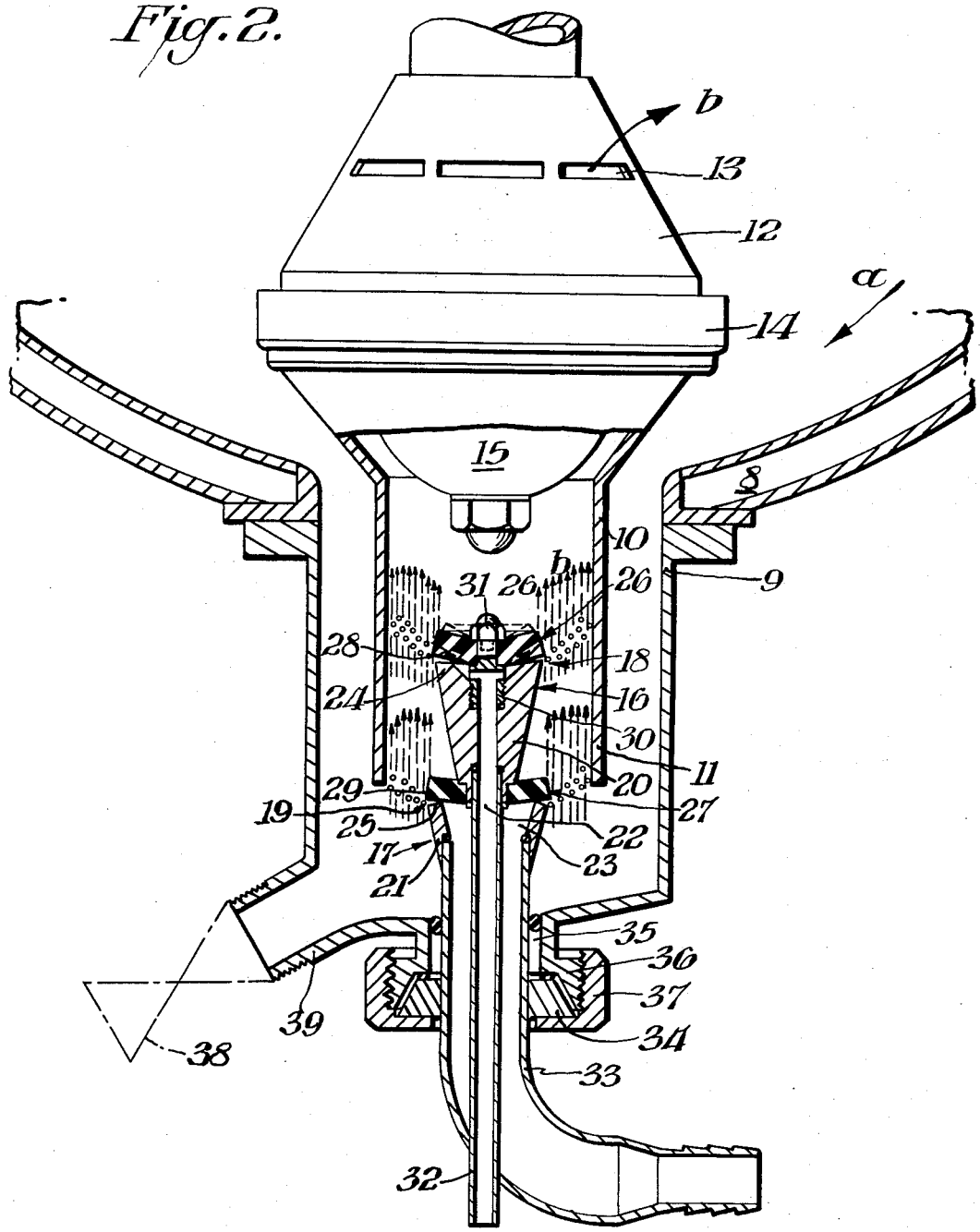

As shown in the drawings, a device for the carrying out of the process for the preparation of suspensions or the like, to which there are prearranged according to FIG. 1 in the frame of an installation in the customary manner storage containers 1 and 2, each with dosing pumps 3 and 4 and with inlet conduits 5 and 6. The device includes a rotationally-symmetric tank 7 with double jacket 8 for the tempering of the content and also includes a cup 9 connected concentrically at the bottom of tank 7, representing in this connection a section of tank 7. A separating pipe 10 is provided for the separation of the outer circular ring zone (a) from the zone (b), situated in the interior of the chamber surrounded by tank 7. As shown in FIG. 2 the cup 9 includes a lower section 11. The upper section 12 of pipe 10 is provided with somewhat nozzle-shaped openings 13, closed per se, and expanded like capsules, but inclined toward the vertical axis of the device until pointing somewhat radially. A conveyor 14 is disposed in the upper section 12 with paddle wheel 15. Two mixing nozzle valves 16 and 17, are arranged in the area of the lower section 11 of separating pipe 10 with each one having circular slot 18 or 19, situated in a plane perpendicular to the vertical axis of the device, nearly radially directed, to be opened variably in its rotationally symmetrical cross-section. The details of these mixing valves are described in greater detail in German application P 19 63 376.2, filed Dec. 18, 1969 and its corresponding U.S. application Ser. No. 98,342 filed Dec. 15, 1970, the details of which are incorporated herein by reference thereto.

As is apparent from FIG. 2 the cross-sectional area of aperture or open flow area of separating pipe 10 has smaller dimensions than annular open flow cross-sectional area between separating pipe 10 and the wall of tank 7 or its cup 9.

As described in the copending application the mixing nozzle valves 16 and 17 essentially consist of a valve body 20 or a valve casing 21, frusto-conically expanded toward the circular slot 18 or 19, with a passage canal 22 or 23 leading to the circular slot 18, 19. A frontal flange surface 24 or 25, represents one wall of circular slot 18, 19. A valve disk 26 or 27, resilient or springy, per se, due to corresponding choice of material, is pressed on the frontal flange surface 24 or 25 by the pressure produced by the spring pretension with this spring pretension being affected due to its deformed mounting, so that the outer circular ring surfaces 28 or 29 of valve disks 26 and 27 represent the other wall of circular slot 18 or 19.

For pretensioning the valve disk 26 there is provided in the valve body 20 an insert 30. Insert 30 has a guideways and an axial stop reacting against the underside of the valve disk 26. A threaded bolt end of insert 30 extends through disk 26. Insert 30 is provided with a passageway which is a continuation of canal 22 directed at first axially and finally somewhat radially and divided into smaller radial canals. The stop shoulder of insert 30 is disposed under the plane of the frontal flange surface 24. Thus, by tightening nut 31, valve disk 26 becomes affected by spring pretension.

Valve disk 27 is held radially by means of a guideways mounted on valve body 20 and held by means of an axial stop and by this stop, which is situated under the plane of the frontal flange surface 25, is pressed against this frontal flange surface 25 with spring pretension. Corresponding to this arrangement, the inner intake pipe 32 for the valve body 20 has longer measurements in this section than the intake pipe 33 for the valve casing 21. Pipe 33 surrounds at a distance like a jacket the inner intake pipe 32. Thus, the mixing nozzle valves 16 and 17, with a lower cost of construction are arranged relatively close behind or over each other.

For the mounting and holding of the structurally united mixing nozzle valves 16 and 17 with the intake pipes 32 and 33, of which the intake pipe 32 is brought in and attached in a curving section of the intake pipe 33, there is first of all applied at the intake pipe 33 a flange 34 provided with a centering cone on its jacket surface. In addition, in the bottom of cup 9 there is arranged an opening 35, larger than the largest circumference of the structurally united mixing nozzle valves 16 and 17, with a threaded flange 36 around the centering cone, against which flange 34 is finally held by means of a screw cap 37. Of course, at all releasable connecting points—which are not further provided with reference numerals—there are inserted gaskets, such as O-rings or the like. Inlet conduits 5 and 6 are connected to inlet pipes 33 or 32. Finally, at cup 9 there is also provided an outlet 39 closable by means of a slide or a valve 38.

The manner of operation according to the process is as follows:

First, the basic component, such as a gelatine salt solution is transferred by means of conveyor 14 through paddle wheel 15 and conducted through separating pipe 10 into a flow, essentially directed downward in its outer circular ring zone (a), and in its zone (b) situated in the interior. Also as a result of the smaller cross-sectional opening given in the separating pipe as compared to the cross-sectional opening between the separating pipe 10 and the wall of tank 7 or its cup 9, the flow rises at high acceleration and consequently revolves rotationally symmetrically.

Then, by means of dosing pump 3, a photographic gelatine salt solution is delivered in cross current from storage tank 1 through circular slot 19 to the gelatine solution, and later to the resultant preparation, in the area of its already rising flow zone (b). By means of dosing pump 4, a silver nitrate solution is delivered in cross-current from storage tank 2 through circular slot 18 in the subsequently rising flow zone (b) in such a manner that the particles of the components are carried through circular slot 18 or 19 into the basic component or the already resultant preparation, vertical to the flow direction thereof, and there takes place a mixing of the particles of each of the further components with the particles of the basic component or of the preparation, distributed over the total cross-sectional opening area between the circular slot 18 and the circular slot 19 on the one side and the separating pipe 10.

In this connection, the cross-current is produced by delivering the further components with this pressure affected by dosing pumps 3 and 4 against the pressure of valve disks 26 and 27 affected by spring pretension, i.e. first by that of the particular component by means of the dosing pumps 3 or 4, the valve disk 26 or 27, in its outer circular ring surface 28 or 29 is lifted from the frontal ring surface 24 or 25 of valve body 20 or valve casing 21 and consequently the circular slot 18 or 19 is opened. Consequently, the components, under a relatively high yet quite precisely adjustable pressure and due to the rotationally symmetric changeability of circular slot 18 and 19, are dispersed in a very effective cross-current into the basic component or the resultant preparation with an adjustable flow-through quantity.

As soon as the conveyance and the pressure on the components by dosing pumps 3 and 4 are lifted, circular slots 18 and 19 close, and valve disks 26 and 27 return to their rest position due to spring pretension.

By delivering the further components in cross-current and by the simultaneous distribution into the basic component with respect to rotationally-symmetrical revolving flow, in a very short time an extraordinarily good dispersion of all components in each other is achieved, whereby the amount delivered of the further components can be determined very precisely and by closing the circular slot any spillage in the rest condition is avoided. Of particular advantage for the exact determination of the amount of the further components is the fact that the delivery under pressure occurs within a range between higher pressures, namely the pressure of the spring pretension and that of the particular component, whereby the amount may be determined much more precisely than with the previous conveyance of the components practically without counter pressure. As a result of the precise ascertainment of the delivery according to time and quantity as well as of the constantly equal distribution of the components in each other, it is now possible to reproduce this process with the required precision.

Of course, the invention is not limited to the example mentioned and particularly not to the exemplary embodiment of the device shown. By corresponding adjustment of pressure in the components and the conveying speed of the basic component, for example, in the section of the lower reversal of the flow, there may also be brought about turbulent flows in special instances. However, of considerable importance are the basic steps of the novel process.

What is claimed is:

1. A device for preparing suspension wherein further components are added to a basic component, comprising a tank, a separating tube in said tank concentrically therewith, said tube having an upper section, motorized uninterrupted conveyance means in said upper section for causing a rotationally symmetric revolving current flow, said pipe having a lower section, a first mixing nozzle valve in the area of said lower section concentric to said pipe, a second mixing valve above the area of said lower section concentric to said pipe, each of said valves including a mixing valve having a circular slot outlet arranged in a plane perpendicular to the vertical axis of said device, spring pretension means urging each of said slot outlets into a closed position, and pump means for supplying the further components to said valves under pressure to overcome said spring pretension means whereby the further components may flow through said slot outlets in a nearly radial direction.

2. The device of claim 1 wherein the cross-sectional opening of said pipe at said lower section is smaller than the annular cross-sectional area between said pipe and said tank.

3. The device of claim 2 wherein said lower section and both of said valves are disposed in a cup-like extension of the bottom of said tank.

4. The device of claim 3 wherein said upper section is closed and has an expanded capsular shape which is provided with substantially nozzle shaped opening inclined to the vertical axis until radially directed.

5. The device of claim 6 wherein each of said valves comprises a valve body which is frusto-conically shaped expanding upwardly and outwardly toward its slot outlet, a passage in said body communicating with its slot outlet, a resilient valve disk connected to the end of said body to form a wall of its respective slot outlet, the end of said body having a frontal flange surface which comprises the other wall of its slot outlet, said pretension means including deformable mounting means for said disk to press said disk on to said frontal flange surface.

6. The device of claim 2 wherein said upper section is closed and has an expanded capsular shape which is provided with substantially nozzle shaped opening inclined to the vertical axis until radially directed.

7. The device of claim 2 wherein each of said valves comprises a valve body which is frusto-conically shaped expanding upwardly and outwardly toward it slot outlet, a passage in said body communicating with its slot outlet, a resilient valve disk connected to the end of said body to form a wall of its slot outlet, the end of said body having a frontal flange surface which comprises the other wall of its slot outlet, said pretension means including deformable mounting means for said disk to press said disk on to said frontal flange surface.

8. The device of claim 1 wherein said lower section and both of said valves are disposed in a cup-like extension of the bottom of said tank.

9. The device of claim 1 wherein said upper section is closed and has an expanded capsular shape which is provided with substantially nozzle shaped opening inclined to the vertical axis until radially directed.

10. The device of claim 1 wherein each of said valves comprises a valve body which is frusto-conically shaped expanding upwardly and outwardly toward its slot outlet, a passage in said body communicating with its slot outlet, a resilient valve disk connected to the end of said body to form a wall of its slot outlet, the end of said body having a frontal flange surface which comprises the other wall of its slot outlet, said pretension means including deformable mounting means for said disk to press said disk on to said frontal flange surface.

* * * * *